US008899638B2

(12) United States Patent
Flamm

(10) Patent No.: US 8,899,638 B2
(45) Date of Patent: Dec. 2, 2014

(54) LOCKING SYSTEM FOR A ROTATABLE PART

(75) Inventor: Frieder Flamm, Stolberg (DE)

(73) Assignee: Flamm GmbH, Aachen (DE)

( * ) Notice: Subject to any disclaimer, the term of this patent is extended or adjusted under 35 U.S.C. 154(b) by 852 days.

(21) Appl. No.: 13/056,098

(22) PCT Filed: Jun. 25, 2009

(86) PCT No.: PCT/EP2009/057965
§ 371 (c)(1),
(2), (4) Date: Jan. 26, 2011

(87) PCT Pub. No.: WO2010/012546
PCT Pub. Date: Feb. 4, 2010

(65) Prior Publication Data
US 2011/0132119 A1 Jun. 9, 2011

(30) Foreign Application Priority Data
Jul. 29, 2008 (DE) ......................... 10 2008 035 395

(51) Int. Cl.
*E05C 19/00* (2006.01)
*E05B 47/02* (2006.01)
*E05C 3/36* (2006.01)
*B62C 7/02* (2006.01)
*E05B 51/02* (2006.01)

(52) U.S. Cl.
CPC ................. *E05C 3/36* (2013.01); *E05B 47/026* (2013.01); *E05B 51/02* (2013.01)
USPC ............... 292/279; 292/144; 188/31; 188/69; 188/265

(58) Field of Classification Search
USPC .................. 74/575–578; 188/20, 31, 69, 265; 70/181–187, 252; 292/2, 3, 8, 32, 33, 292/41, 144, 279, 280
See application file for complete search history.

(56) References Cited

U.S. PATENT DOCUMENTS 812,050 A * 2/1906 Kunzler ......................... 292/279
944,542 A * 12/1909 Crease-Williams .......... 292/279
(Continued)

FOREIGN PATENT DOCUMENTS

DE 102 09 209 2/2004
DE 203 19 484 4/2004
(Continued)

OTHER PUBLICATIONS

Computer-Generated Translation of JP 06-55035B.*

*Primary Examiner* — Kristina Fulton
*Assistant Examiner* — Alyson M Merlino
(74) *Attorney, Agent, or Firm* — Lucas & Mercanti, LLP

(57) ABSTRACT

The invention relates to a locking system for a rotatable part, in particular in arrangements in which two parts which can be rotated in relation to each other, for example a die and a punch in a stamping apparatus, have to be aligned exactly in relation to each other. In order to provide a positionally accurate mechanical locking system with a simple design, the invention proposes that a gearwheel (3) having an end-side and/or axially effective toothing system (4) is connected to the rotatable part (2) fixedly in terms of rotation, and that at least one toothing segment (5*a*-5*f*) which can move to and fro in the direction of the axis of rotation and/or parallel to the axis of rotation of the gearwheel is arranged over the circumference of the gearwheel, wherein the teeth or gaps between the teeth of the toothing segment and gearwheel can be brought into engagement without play.

10 Claims, 2 Drawing Sheets

(56) References Cited

U.S. PATENT DOCUMENTS

| | | | | |
|---|---|---|---|---|
| 1,190,811 | A * | 7/1916 | Swoyer et al. | 188/31 |
| 1,365,841 | A * | 1/1921 | Mellenthin | 188/31 |
| 1,558,193 | A * | 10/1925 | Lucking | 292/201 |
| 1,966,308 | A * | 7/1934 | Otis | 188/30 |
| 1,994,142 | A * | 3/1935 | Madsen | 160/190 |
| 2,121,869 | A * | 6/1938 | Greenawalt | 188/2 R |
| 2,494,754 | A | 4/1946 | Goughnour | |
| 2,525,426 | A * | 10/1950 | Rockwell | 60/557 |
| 2,817,418 | A * | 12/1957 | Vial | 188/69 |
| 3,010,750 | A | 11/1961 | Cockburn | |
| 3,078,964 | A * | 2/1963 | Wildhaber | 188/69 |
| 3,664,515 | A * | 5/1972 | Orendorff et al. | 212/280 |
| 3,699,608 | A * | 10/1972 | Schwarz | 16/79 |
| 3,738,672 | A * | 6/1973 | Dalton | 280/3 |
| 3,915,032 | A * | 10/1975 | Ottemann | 475/231 |
| 4,191,377 | A * | 3/1980 | Burnside | 273/143 R |
| 5,176,267 | A * | 1/1993 | Pech | 212/180 |
| 5,214,834 | A * | 6/1993 | Froment | 29/434 |
| 5,253,693 | A * | 10/1993 | Marlatt et al. | 160/7 |
| 5,549,183 | A * | 8/1996 | Buchanan et al. | 188/265 |
| 5,719,712 | A | 2/1998 | Ishikawa | |
| 5,740,891 | A * | 4/1998 | Song | 188/326 |
| 6,000,489 | A * | 12/1999 | Rick | 180/287 |
| 6,199,442 | B1 * | 3/2001 | Bauer et al. | 74/411.5 |
| 6,394,255 | B1 * | 5/2002 | Mohammed-Fakir et al. | 192/139 |
| 6,619,460 | B1 * | 9/2003 | Carlsson et al. | 192/219.5 |
| 6,889,532 | B2 * | 5/2005 | Fukushima | 70/185 |
| 6,981,538 | B2 * | 1/2006 | English | 160/7 |
| 7,048,096 | B2 * | 5/2006 | Ozechowski | 188/74 |
| 2010/0301785 | A1 * | 12/2010 | Davis et al. | 318/365 |

FOREIGN PATENT DOCUMENTS

| | | |
|---|---|---|
| DE | 10 2006 038 642 | 12/2007 |
| EP | 0945556 A1 | 9/1999 |
| FR | 1 293 564 | 5/1962 |
| GB | 03516 | 11/1910 |
| JP | 56-157440 | 11/1981 |
| JP | 61-022775 | 1/1986 |
| JP | 09-179040 | 7/1997 |
| JP | 11-315863 | 11/1999 |
| JP | 2002002968 | 1/2002 |
| JP | 2005-042842 | 2/2005 |

* cited by examiner

LOCKING SYSTEM FOR A ROTATABLE PART

CROSS-REFERENCE TO RELATED APPLICATIONS

This is a U.S. national stage of application No. PCT/EP2009/057965, filed on Jun. 25, 2009. Priority is claimed on German Application No. 10 2008 035 395.7, filed Jul. 29, 2008, the content of which is incorporated here by reference.

BACKGROUND OF THE INVENTION

1. Field of the Invention

The invention pertains to a locking system for a rotatable part.

2. Description of the Prior Art

Especially in arrangements in which two parts which can rotate relative to each other must be aligned precisely with respect to each other, a conceivable possibility of locking them consists in allowing two gear wheels, each connected to its own rotary drive, to engage with a spur gear connected to the rotatable part. These two gear wheels then hold the spur gear in the locked position.

A locking system for automobile doors, furthermore, is known from U.S. Pat. No. 2,494,754 A. The locking mechanism comprises a toothed segment supported movably on the door, which, to lock the door, engages in a gear wheel with involute teeth held in a stationary position on the vehicle. The gear wheel can rotate until it reaches the locking position of the door and is then locked in that position by coupling rollers, which prevent it from rotating in the opposite direction.

The first conceivable solution is quite complicated and therefore expensive, whereas the door locking system is not suitable for aligning two parts, especially mutually rotatable parts, and for holding them precisely in position.

SUMMARY OF THE INVENTION

An object of the present invention is to provide a mechanical locking system of simple design for holding a rotatable part precisely in position, especially without the need for two rotary drives.

The object is achieved by a rotatable part having a gear wheel with radially and/or axially acting teeth connected nonrotatably to the rotatable part, e.g., the shaft of a punching device, and at least one toothed segment, which can move back and forth, toward or away from the axis of rotation and/or parallel to the axis of rotation of the gear wheel, is arranged on the periphery of the gear wheel, wherein the teeth and the tooth spaces of the toothed segment and the gear wheel can be brought into engagement with each other without play.

Because of the two-dimensional engagement of the teeth of the toothed segment in the tooth spaces of the gear wheel and vice versa, the locking is free of play in the technical sense, which thus guarantees exact positioning. The flanks of the teeth rest against each other preferably over their entire surfaces. The play usually resulting when tooth flanks make linear contact with each other is thus avoided.

In one embodiment, the gear includes an axially acting tooth system such as that of a crown gear. Crown gears are gear wheels in which the contact surface lies on the face of the wheel.

The back-and-forth movement of the individual toothed segments is accomplished by linear drives, one of which is provided for each segment. Any type of drive system can be considered as long as it leads to the translational movement of the toothed segment in a straight line or along some other predetermined path. The linear drives are preferably hydraulic or pneumatic cylinders, the drive control of which is coordinated with the control of the rotary drive for the rotatable part in such a way that the toothed segment can be engaged with the gear wheel in the position in which the gear wheel is to be locked.

To increase the number of locking positions, several of these toothed segments are preferably arranged around the periphery of the gear wheel. Relative to the first engageable toothed segment, all of the other engageable toothed segments are offset from the first engageable toothed segment by a different fraction of the pitch of the gear wheel or toothed segment. The pitch of the gear wheel or of the toothed segment is defined as the distance between one tooth flank and the next.

Each toothed segment makes it possible to lock the gear wheel and thus the rotatable part in many different positions, the number of possible positions corresponding to the number of teeth of the gear wheel, wherein the individual toothed segments are offset by amounts equivalent to, for example, half of the tooth pitch, one-fourth of the tooth pitch, and one-eighth of the tooth pitch; thus the rotatable part can be locked in any one of a large number of different rotational positions.

To further increase the number of locking positions, it is also possible for several of the toothed segments which can be brought into engagement with the radial tooth system to be arranged adjacent to each other in the axial direction of the axis of rotation of the gear wheel and also to be arranged around the periphery of the gear wheel with an offset from each other equivalent to a fraction of the pitch. In this case, the radial tooth system of the gear wheel must be wide enough that all of the toothed segments arranged parallel to each other can engage in the gear wheel. Alternatively, however, it is also possible for the toothed segments arranged axially adjacent to each other to be actuated, by the displacement of the package of toothed segments in the axial direction, so that the specific toothed segment to be brought into engagement is aligned with the radial tooth system of the gear wheel.

Alternatively or in addition, the toothed segments of a package of adjacently arranged toothed segments can be designed so that they can move axially in the direction parallel to the axis of rotation of the gear wheel and are also arranged around the periphery of the gear wheel with an offset from each other equivalent to a fraction of the pitch so that, for example, they can engage from above in the crown gear tooth system on the face of the gear wheel. In this case, it is worth recommending that, in each locking position, two toothed segments be brought into engagement with the crown gear tooth system simultaneously, wherein the two toothed segments are offset by 180° from each other around the periphery. As a result, the torque exerted by the pressure of the toothed segment against the gear wheel is compensated in optimal fashion.

If each toothed segment is adjustable in the circumferential direction around the axis of rotation of the gear wheel, the locking position can be determined with almost complete freedom; in addition, the offsets between the various toothed segments can be adjusted. The adjustment of the gear wheel includes a fixation in the selected position.

BRIEF DESCRIPTION OF THE DRAWINGS

The invention is explained in greater detail below on the basis of the drawings, in which.

DETAILED DESCRIPTION OF THE PREFERRED EMBODIMENTS

Figure 1:
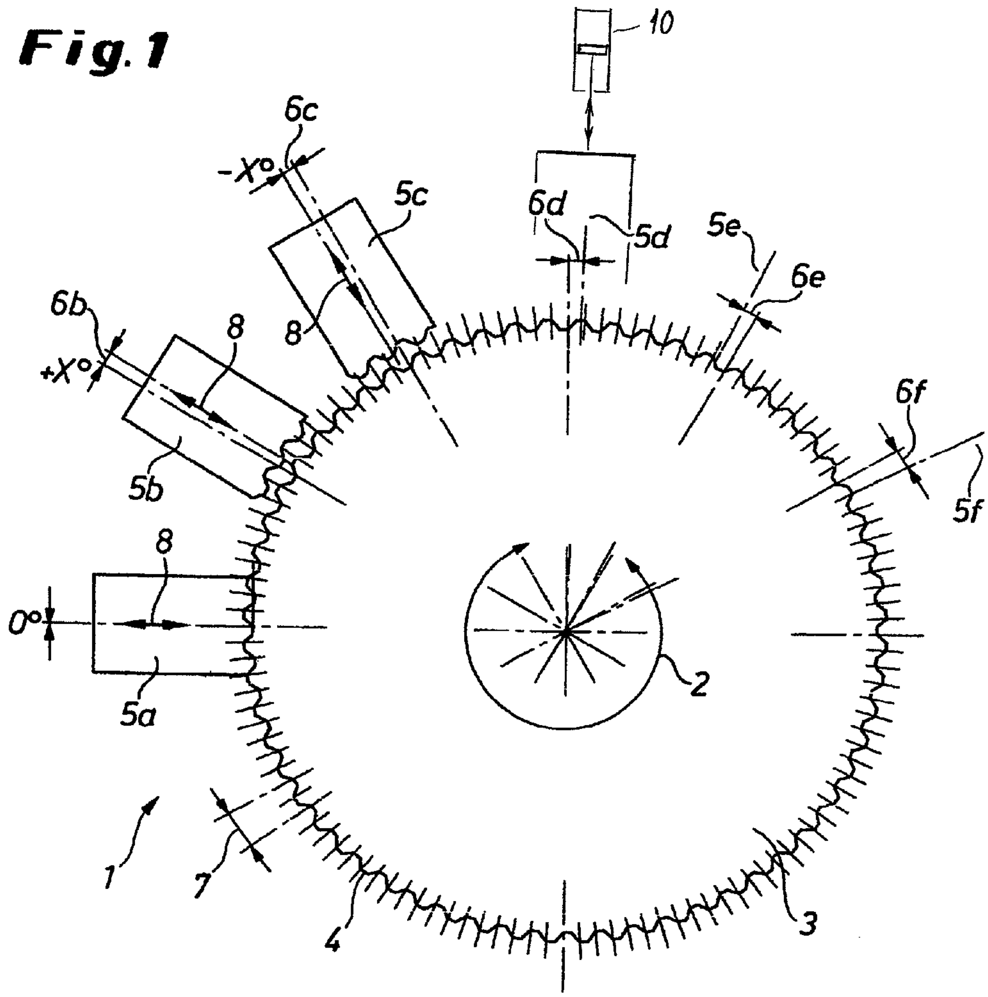
FIG. 1 is a schematic plan view of the locking system according to an embodiment of the present invention.

According to FIG. 1, the locking system 1 for a rotatable part, such as the shaft 2 of a punching device with a rotatable punch and a rotatable die, is connected nonrotatably to a gear wheel 3, which comprises a tooth system 4 extending around the periphery.

In the example, six toothed segments 5_a_-5_f_, which are free to move back and forth in the direction toward or away from the axis of rotation of the shaft 2, are arranged around the periphery of the gear wheel 3. Only the toothed segments 5_a-c_ are shown in their entirety. The teeth and the tooth spaces of each toothed segment 5 contacts the gear wheel 3 other over the entire surfaces when the each toothed segment 5 is brought into engagement, as can be seen in the case of the first toothed segment 5_a_, which is shown in the engaged state. As a result, the shaft 2 is locked without play in the first locking position shown in FIG. 1.

Relative to the first tooth segment 5_a_ shown engaged in FIG. 1, the other toothed segments 5_b_-5_f_, which are arranged clockwise around the periphery of the gear wheel 3, are each offset from the first tooth segment 5_a_ by certain fraction 6_b_-6_f_ of the pitch 7 of the gear wheel or toothed segment.

The back-and-forth movement 8 of the individual toothed segments 5_a_-5_f_ is accomplished by, for example, a linear drive 10 such as a pneumatic or hydraulic cylinder.

Each toothed segment 5_a_-5_f_ makes it possible to lock the gear wheel 3 and thus the rotatable part 2 in any one of a number of different positions, this number corresponding to the number of teeth of the gear wheel, wherein the offset arrangement of the individual toothed segments 5_a_-5_f_ increases the number of possible locking positions; that is, each offset toothed segment 5_a_-5_f_ increases the number by 60, the basic division of the gear wheel 3.

In the exemplary embodiment shown here, only one toothed segment 5_a_-5_f_ can ever be brought into engagement at a time.

Figure 2:
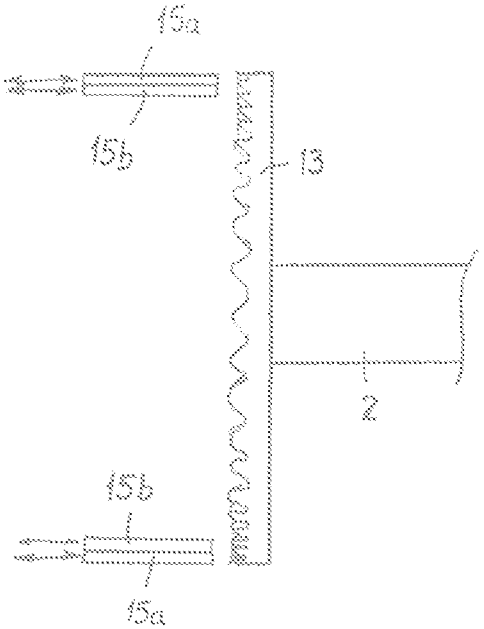
FIG. 2 is a side view of another embodiment of the present invention.

Especially in cases where the toothed segments 15_a, b_ engage with a crown gear 13, that is, where they move parallel to the longitudinal axis of the shaft 2, as shown in FIG. 2, i.e., 15_a_, 15_b_, it is advisable for two opposing toothed segments to engage simultaneously, which then obviously may not be offset from each other with respect to pitch. As further shown in FIG. 2, two toothed segments 15_a_, 15_b_ are arranged one on top of the other. In this case, they are offset around the periphery by a fraction of the pitch of the gear wheel 13. Similarly two or more of the toothed segments 5_a_-5_f_ in FIG. 1 may be arranged adjacent to each other axially and offset around the periphery of the gear wheel 3.

The invention claimed is:

1. A locking system for a rotatable part, comprising:

a gear wheel having a tooth system and an axis of rotation, the gear wheel being one of connected and connectable to the rotatable part, the tooth system having a pitch; and a plurality of toothed segments arranged along a periphery of the gear wheel, each of the plurality of toothed segments is movable toward and away from the tooth system in a direction that is one of toward and away from the axis of rotation and parallel to the axis of rotation, wherein teeth and tooth spaces of e h of said plurality of tooth segments are engageable with the tooth system without play, wherein a first toothed segment of the plurality of toothed segments engages the tooth system at a first position of the gear wheel and each of the others of the plurality of toothed segments are engageable with the tooth system of the gear wheel at positions of the gear wheel that are offset from the first position by different non-whole number fractions of the pitch, and wherein each toothed segment of the plurality of toothed segments is adjustable in a circumferential direction around the axis of rotation of the gear wheel and is fixable in the selected position, whereby the offset between each of the plurality of toothed segments is adjustable.

2. The locking system of claim 1, wherein tooth flanks on teeth of the toothed segment and tooth flanks on teeth of the gear wheel contact each other two-dimensionally.

3. The locking system of claim 1, wherein the tooth system of the gear wheel is a radially acting tooth system.

4. The locking system of claim 1, wherein the tooth system of the gear wheel is an axially acting tooth system.

5. The locking system of claim 4, wherein the axially acting tooth system is a crown gear tooth system.

6. The locking system of claim 1, wherein the back-and-forth movement of the toothed segments is accomplished by linear drives.

7. The locking system of claim 6, wherein each linear drive is a hydraulic or pneumatic cylinder.

8. The locking system of claim 1, wherein several of the plurality of toothed segments that can engage with the tooth system are arranged adjacent to each other in an axial direction of the axis of rotation of the gear wheel and are arranged around the periphery of the gear wheel with an offset from each other equivalent to a fraction of the pitch.

9. The locking system of claim 1, wherein several of the plurality of toothed segments that can engage with the tooth system are arranged adjacent to each other parallel to the axis of rotation of the gear wheel and are arranged around the periphery of the gear wheel with an offset from each other equivalent to a fraction of the pitch.

10. The locking system of claim 1, further comprising a plurality of additional toothed segments, each of the plurality of additional toothed segments being arranged opposite a respective one of the plurality of toothed segments.

* * * * *